United States Patent
Häkkinen et al.

(10) Patent No.: US 7,095,290 B2
(45) Date of Patent: Aug. 22, 2006

(54) METHOD AND SYSTEM FOR GENERATING HIGHER ORDER MODULATIONS WITH QPSK MODULATOR

(75) Inventors: Hannu Häkkinen, Espoo (FI); Pekka Kyösti, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/499,106

(22) PCT Filed: Dec. 18, 2001

(86) PCT No.: PCT/EP01/14960

§ 371 (c)(1),
(2), (4) Date: Jul. 21, 2004

(87) PCT Pub. No.: WO03/053021

PCT Pub. Date: Jun. 26, 2003

(65) Prior Publication Data

US 2005/0089118 A1    Apr. 28, 2005

(51) Int. Cl.
*H04L 27/22* (2006.01)
*H04L 9/00* (2006.01)

(52) U.S. Cl. ............... 332/103; 375/130; 380/268

(58) Field of Classification Search ........ 332/103; 375/130; 380/268
See application file for complete search history.

(56) References Cited

U.S. PATENT DOCUMENTS

| 4,241,447 A * | 12/1980 | Epstein ........ 375/150 |
| 2001/0038616 A1 | 11/2001 | Fong et al. ........ 370/329 |
| 2002/0067757 A1* | 6/2002 | Philips et al. ........ 375/130 |

FOREIGN PATENT DOCUMENTS

| EP | 0 583 059 A1 | 2/1994 |
| EP | 0 768 782 A1 | 4/1997 |
| EP | 0 982 905 A1 | 3/2000 |
| WO | WO 00/48336 | 8/2000 |

* cited by examiner

*Primary Examiner*—Joseph Chang
(74) *Attorney, Agent, or Firm*—Squire, Sanders & Dempsey LLP

(57) ABSTRACT

Method and system for generating higher order modulations with QPSK modulators. A complex sequence of binary digits is input to QPSK modulators. The binary digits are mapped to constellation points and multiplied with weighting coefficient. Constellation points of higher order modulation are mapped to inputs of the QPSK modulator, and, after modulation QPSK symbols are summed to compose symbols of higher order modulation.

15 Claims, 8 Drawing Sheets

8PSK constellation with constant amplitude of sqrt(2) = 1.4142.

Table 1
8PSK symbols represented with binary inputs to weight 1 and $\sqrt{2}$ QPSK spreaders (mapping (0,1,dtx) →(1,-1,0), dtx symbol corresponds to zero).

| 8PSK Symbol [I Q] | | weigth 1 spreader input [I Q] | | weigth $\sqrt{2}$ spreader input [I Q] | |
|---|---|---|---|---|---|
| $\sqrt{2}$ | 0 | dtx | dtx | 0 | dtx |
| 1 | 1 | 0 | 0 | dtx | dtx |
| 0 | $\sqrt{2}$ | dtx | dtx | dtx | 0 |
| -1 | -1 | 1 | 1 | dtx | dtx |
| $-\sqrt{2}$ | 0 | dtx | dtx | 1 | dtx |
| -1 | -1 | 1 | 1 | dtx | dtx |
| 0 | $-\sqrt{2}$ | dtx | dtx | dtx | 1 |
| 1 | -1 | 0 | 1 | dtx | dtx |

Fig. 3

16QAM constellation.

Table 2

16QAM symbols represented with binary inputs to weight 1 and 3 QPSK spreaders (mapping (0,1,dtx) →(1,-1,0), dtx symbol corresponds to zero)

| 16QAM symbol [I Q] | | weigth 1 spreader input [I Q] | | weigth 3 spreader input [I Q] | |
|---|---|---|---|---|---|
| 3 | 3 | dtx | dtx | 0 | 0 |
| 3 | 1 | dtx | 0 | 0 | dtx |
| 3 | -1 | dtx | 1 | 0 | dtx |
| 3 | -3 | dtx | dtx | 0 | 1 |
| 1 | 3 | 0 | dtx | dtx | 0 |
| 1 | 1 | 0 | 0 | dtx | dtx |
| 1 | -1 | 0 | 1 | dtx | dtx |
| 1 | -3 | 0 | dtx | dtx | 1 |
| -1 | 3 | 1 | dtx | dtx | 0 |
| -1 | 1 | 1 | 0 | dtx | dtx |
| -1 | -1 | 1 | 1 | dtx | dtx |
| -1 | -3 | 1 | dtx | dtx | 1 |
| -3 | 3 | dtx | dtx | 1 | 0 |
| -3 | 1 | dtx | 0 | 1 | dtx |
| -3 | -1 | dtx | 1 | 1 | dtx |
| -3 | -3 | dtx | dtx | 1 | 1 |

Fig. 5

64QAM constellation.

Fig. 7A
64QAM symbols represented with binary inputs

| 64QAM symbol [I  Q] | weigth 1 spreader input [I  Q] | weigth 2 spreader input [I  Q] | weigth 5 spreader input [I  Q] |
|---|---|---|---|
| 7   7 | dtx   dtx | 0   0 | 0   0 |
| 7   5 | dtx   dtx | 0   dtx | 0   0 |
| 7   3 | dtx   0 | 0   0 | 0   dtx |
| 7   1 | dtx   0 | 0   dtx | 0   dtx |
| 7   -1 | dtx   1 | 0   dtx | 0   dtx |
| 7   -3 | dtx   1 | 0   1 | 0   dtx |
| 7   -5 | dtx   dtx | 0   dtx | 0   1 |
| 7   -7 | dtx   dtx | 0   1 | 0   1 |
| 5   7 | dtx   dtx | dtx   0 | 0   0 |
| 5   5 | dtx   dtx | dtx   dtx | 0   0 |
| 5   3 | dtx   0 | dtx   0 | 0   dtx |
| 5   1 | dtx   0 | dtx   dtx | 0   dtx |
| 5   -1 | dtx   1 | dtx   dtx | 0   dtx |
| 5   -3 | dtx   1 | dtx   1 | 0   dtx |
| 5   -5 | dtx   dtx | dtx   dtx | 0   1 |
| 5   -7 | dtx   dtx | dtx   1 | 0   1 |
| 3   7 | 0   dtx | 0   0 | dtx   0 |
| 3   5 | 0   dtx | 0   dtx | dtx   0 |
| 3   3 | 0   0 | 0   0 | dtx   dtx |
| 3   1 | 0   0 | 0   dtx | dtx   dtx |
| 3   -1 | 0   1 | 0   dtx | dtx   dtx |
| 3   -3 | 0   1 | 0   1 | dtx   dtx |
| 3   -5 | 0   dtx | 0   dtx | dtx   1 |
| 3   -7 | 0   dtx | 0   1 | dtx   1 |
| 1   7 | 0   dtx | dtx   0 | dtx   0 |
| 1   5 | 0   dtx | dtx   dtx | dtx   0 |
| 1   3 | 0   0 | dtx   0 | dtx   dtx |
| 1   1 | 0   0 | dtx   dtx | dtx   dtx |

| 64QAM symbol [I Q] | weigth 1 spreader input [I Q] | weigth 2 spreader input [I Q] | weigth 5 spreader input [I Q] |
|---|---|---|---|
| 1  -1 | 0    1 | dtx  dtx | dtx  dtx |
| 1  -3 | 0    1 | dtx  1 | dtx  dtx |
| 1  -5 | 0    dtx | dtx  dtx | dtx  1 |
| 1  -7 | 0    dtx | dtx  1 | dtx  1 |
| -1  7 | 1    dtx | dtx  0 | dtx  0 |
| -1  5 | 1    dtx | dtx  dtx | dtx  0 |
| -1  3 | 1    0 | dtx  0 | dtx  dtx |
| -1  1 | 1    0 | dtx  dtx | dtx  dtx |
| -1  -1 | 1    1 | dtx  dtx | dtx  dtx |
| -1  -3 | 1    1 | dtx  1 | dtx  dtx |
| -1  -5 | 1    dtx | dtx  dtx | dtx  1 |
| -1  -7 | 1    dtx | dtx  1 | dtx  1 |
| -3  7 | 1    dtx | 1    0 | dtx  0 |
| -3  5 | 1    dtx | 1    dtx | dtx  0 |
| -3  3 | 1    0 | 1    0 | dtx  dtx |
| -3  1 | 1    0 | 1    dtx | dtx  dtx |
| -3  -1 | 1    1 | 1    dtx | dtx  dtx |
| -3  -3 | 1    1 | 1    1 | dtx  dtx |
| -3  -5 | 1    dtx | 1    dtx | dtx  1 |
| -3  -7 | 1    dtx | 1    1 | dtx  1 |
| -5  7 | dtx  dtx | dtx  0 | 1    0 |
| -5  5 | dtx  dtx | dtx  dtx | 1    0 |
| -5  3 | dtx  0 | dtx  0 | 1    dtx |
| -5  1 | dtx  0 | dtx  dtx | 1    dtx |
| -5  -1 | dtx  1 | dtx  dtx | 1    dtx |
| -5  -3 | dtx  1 | dtx  1 | 1    dtx |
| -5  -5 | dtx  dtx | dtx  dtx | 1    1 |
| -5  -7 | dtx  dtx | dtx  1 | 1    1 |
| -7  7 | dtx  dtx | 1    0 | 1    0 |
| -7  5 | dtx  dtx | 1    dtx | 1    0 |
| -7  3 | dtx  0 | 1    0 | 1    dtx |
| -7  1 | dtx  0 | 1    dtx | 1    dtx |
| -7  -1 | dtx  1 | 1    dtx | 1    dtx |
| -7  -3 | dtx  1 | 1    1 | 1    dtx |
| -7  -5 | dtx  dtx | 1    dtx | 1    1 |
| -7  -7 | dtx  dtx | 1    1 | 1    1 |

Fig. 7B

METHOD AND SYSTEM FOR GENERATING HIGHER ORDER MODULATIONS WITH QPSK MODULATOR

FIELD AND BACKGROUND OF THE INVENTION

The invention relates to communication network and communication system, and in particular to the generation of signal modulation in a communication system.

In some current communication networks, e.g. in a WCDMA (Wideband Code Division Multiple Access) system, the normal downlink (and uplink) modulation is QPSK (Quadrature Phase Shift Keying). A service HSDPA (High Speed Downlink Packet Access) introduces new modulation schemes. 8PSK (Phase Shift Keying), 16QAM and 64QAM modulations (QAM=Quadrature Amplitude Modulation) are proposals in standardization. A problem is how to generate these higher order constellations with existing (on HW) QPSK modulators.

SUMMARY OF THE INVENTION

The present invention provides a method and system as defined in the independent claims or any one of the dependent claims.

Higher order constellations can be generated by summing weighted QPSK symbols. Mapping tables are generated for different modulation schemes. 8PSK symbols can be composed by summing the outputs of two separately weighted QPSK modulators. 16QAM needs also two and 64QAM three QPSK modulators.

Some of the advantages of the invention are that no new hardware is needed. Further, flexible implementation is achieved, and new modulations can be quickly implemented and used.

BRIEF DESCRIPTION OF THE DRAWINGS

FIG. 3 shows a basic structure of a table, which lists 8PSK symbols represented with binary inputs to weighting coefficient 1 and $\sqrt{2}$ QPSK spreaders usable in a communication system and method in accordance with an embodiment of the invention, FIG. 5 shows a table, which illustrates 16QAM symbols, represented with binary inputs to weighting coefficient 1 and 3 QPSK spreaders 1, in accordance with an embodiment of the invention.

DETAILED DESCRIPTION OF PREFERRED EMBODIMENTS OF THE INVENTION

The invention provides a method and system for generating higher order modulations with QPSK modulators.

Spreading and modulation are performed in the same operation in the transmitter. QPSK spreader/modulator takes as an input complex sequence of binary digits, these digits are mapped to constellation points {1+1; 1+j; −1+j; −1−j} and multiplied with weighting coefficient. Signal is spread by multiplying it with spreading code. Weighting coefficients are of two kind; real valued for tuning of amplitude only and complex valued for tuning of phase. Output of a spreader/modulator can be set also to zero by using so called DTX symbol.

Figure 1:
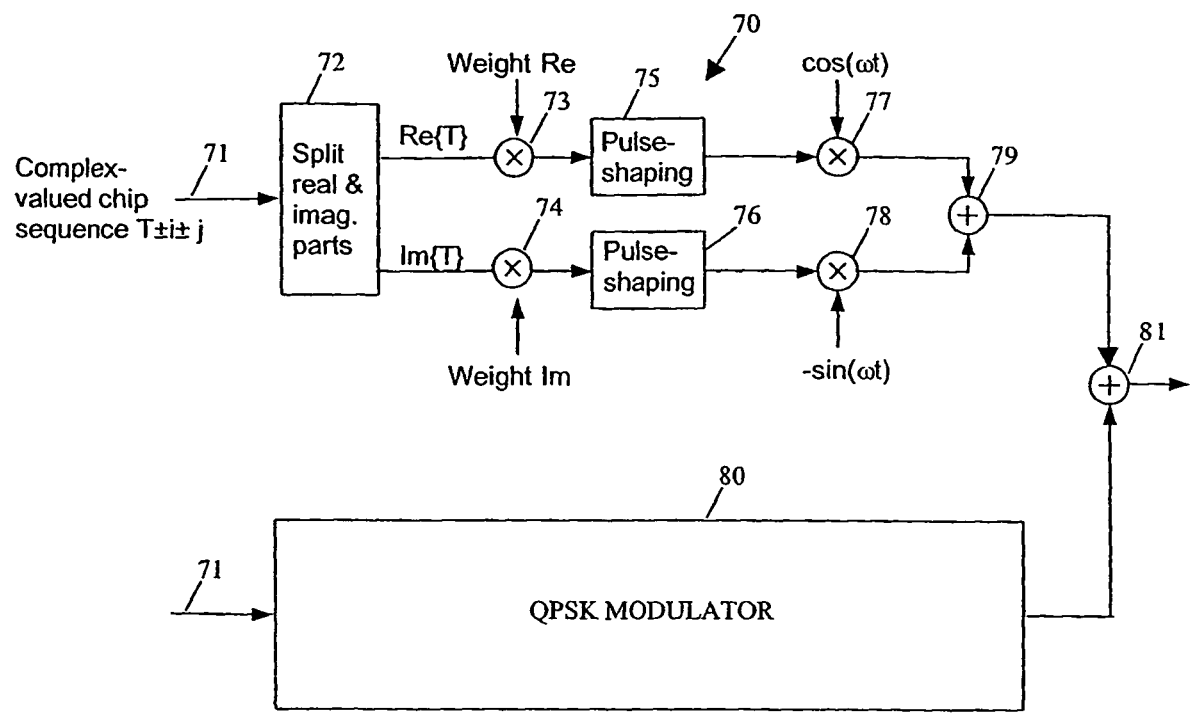
FIG. 1 illustrates a basic embodiment in accordance with the invention.

FIG. 1 shows an embodiment of a system or device in accordance with the invention. Two QPSK modulators 70, 80 receive a complex-valued chip sequence ($T_{\pm i \pm j}$) 71 from spreading operations. The structure of the QPSK modulator 70 is shown in detail. The structure of QPSK modulator 80 is the same as that of modulator 70.

As shown in FIG. 1, each modulator 70, 80 comprises a splitter 72 for splitting the input signals 71 in their real parts RE{T} and imaginary parts IM{T}. Each real parts RE{T} and imaginary parts IM{T} are applied to a multiplier 73, 74, resp., for multiplication with a weighting coefficient Weight Re, Weight Im, resp. The outputs of the multipliers 73, 74, are applied to a pulse shaper 75, 76, resp., for pulse shaping.

The output of the pulse shaper 75 is applied to a multiplier 77 for multiplication with $\cos(\omega t)$, whereas the output of the pulse shaper 76 is applied to a multiplier 78 for multiplication with $-\sin(\omega t)$. The outputs of the multipliers 77, 78, are additively combined by an adder 79 to provide an output signal of the QPSK modulator 70 which is applied to an adder 81. The output signal of QPSK modulator 80 is likewise supplied to an input of the adder 81 which provides the final output of the QPSK modulator arrangement in accordance with an embodiment of the invention.

E.g., 8PSK symbol (or 16QAM symbol) is obtained by summing the outputs of the two spreaders/modulators 70, 80 by means of the adder 81.

Constellation points of higher order modulation are mapped to inputs (0, 1 or DTX(=Discontinuous Transmission mode)) of weighted QPSK modulators. After modulation and spreading the QPSK symbols are summed to compose higher order modulation symbols. Because the QPSK modulated sequences have same spreading code, and spreading is linear operation, they can be summed up.

Example constellations and corresponding mapping tables are shown in FIGS. 2 to 7.

Constellation of 8PSK can be rotated by multiplying both weighting coefficients with appropriate complex number. Amplitudes and phases (e.g. in case of TPC (TPC=Transmit Power Control) or closed loop mode2 transmit diversity of resulting symbols can be tuned by multiplying weighting coefficients of all the QPSK modulators with the desired coefficient. For example if similar constant rotation as in EDGE (Enhanced Data Rates for GSM Evolution) modulation is needed, constant weighting coefficient $e^{j \cdot 3 \cdot \pi / 8}$ can be used.

It is not desirable to change weighting coefficients very frequently (e.g. from symbol to symbol or even time slot to time slot). This is the reason why pairs of QPSK symbol and proper complex weighting coefficient preferably are not used for higher order symbol generation. If new weighting coefficient can be set for each symbol, only one modulator is needed.

The constellations can be generated with many different combinations of weighting coefficients and mapping tables. The tables shown in the drawings use only real valued weighting coefficients. The best solutions are solutions, which do not need too much accuracy in the sense of word lengths in fixed point implementation.

The invention can e.g. be used in a BTS (Base Station) platform.

In the following, embodiments in accordance with the invention will be explained providing 8PSK, 16QAM and 64QAM symbol generation with QPSK modulators.

High Speed Downlink Packet Access (HSDPA) concept contains several modulation schemes. Symbols of higher order modulations can be generated by summing up a number of weighted QPSK symbols.

Figure 2:
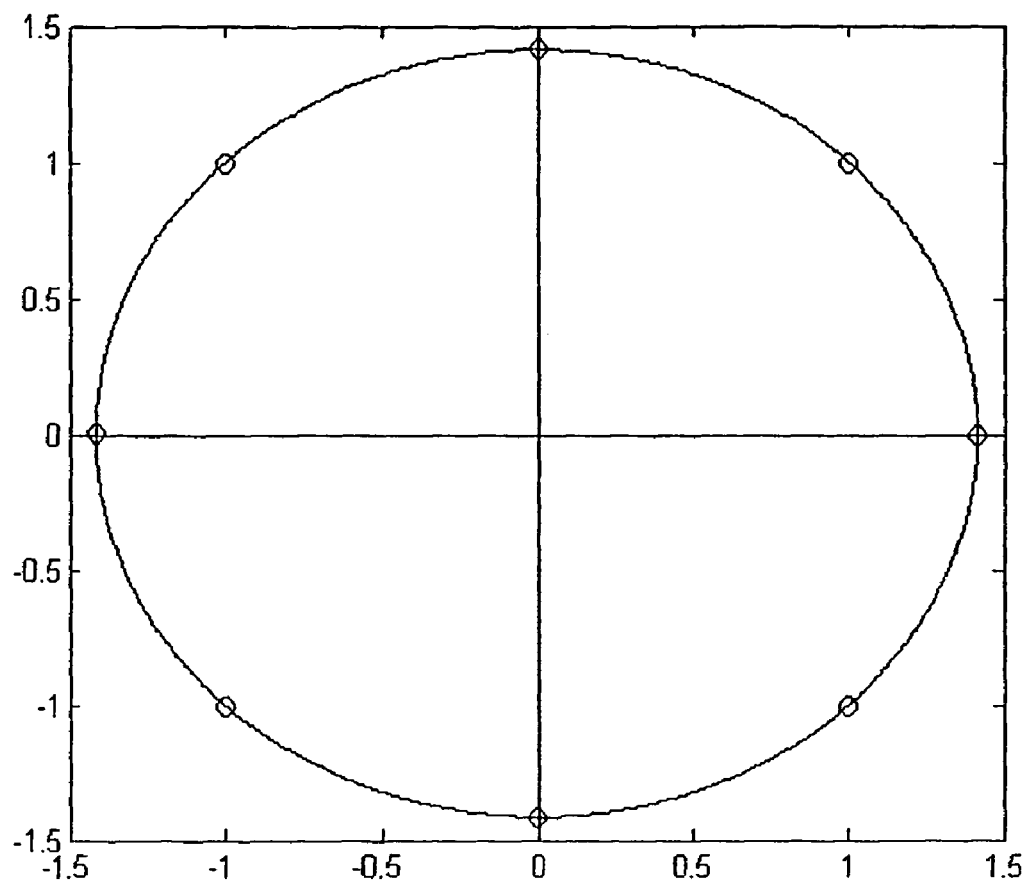
FIG. 2 illustrates a basic embodiment in accordance with the invention, and shows an 8PSK constellation with constant amplitude of $\sqrt{2}$.

FIG. 2 illustrates 8PSK constellation with constant amplitude of $\sqrt{2}$ (=1.4142). The eight circles shown in FIG. 2 represent the positions of the 8PSK symbols.

FIG. 3 shows a Table 1 which lists 8PSK-symbols represented with binary inputs to weighting coefficient 1 and $\sqrt{2}$ QPSK spreaders (mapping (0,1,dtx)→(1,−1,0), dtx symbol corresponds to zero). The first column contains the 8PSK symbols, the two other columns contain the corresponding input to spreaders/modulators to obtain the 8PSK symbol. 8PSK symbol is obtained by summing the outputs of the two spreaders/modulators. First spreader has weighting coefficient 1 and second spreader has weighting coefficient $\sqrt{2}$.

Figure 4:
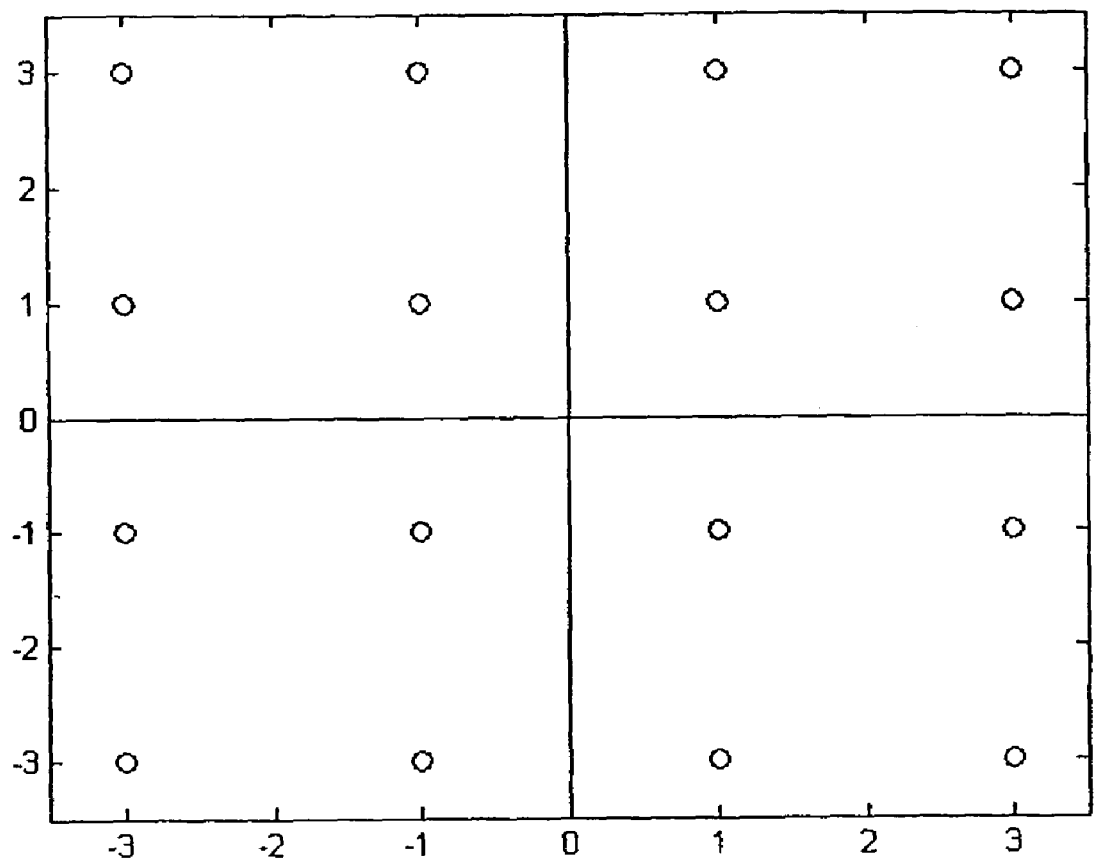
FIG. 4 illustrates a 16QAM constellation in accordance with an embodiment of the invention.

FIG. 4 shows a 16QAM constellation. The 16 circles shown in FIG. 4 represent the positions of the 16QAM symbols.

The Table 2 shown in FIG. 5 illustrates 16QAM symbols represented with binary inputs to weighting coefficient 1 and 3 QPSK spreaders (mapping (0,1,dtx)→(1,−1,0), dtx symbol corresponds to zero).

The first column of Table 2 contains the 16QAM symbols, the two other columns contain the corresponding input to spreaders/modulators to obtain the 16QAM symbol. 16QAM symbol is obtained by summing the outputs of the two spreaders/modulators. First spreader has weighting coefficient 1 and the second spreader has weighting coefficient 3.

Figure 6:
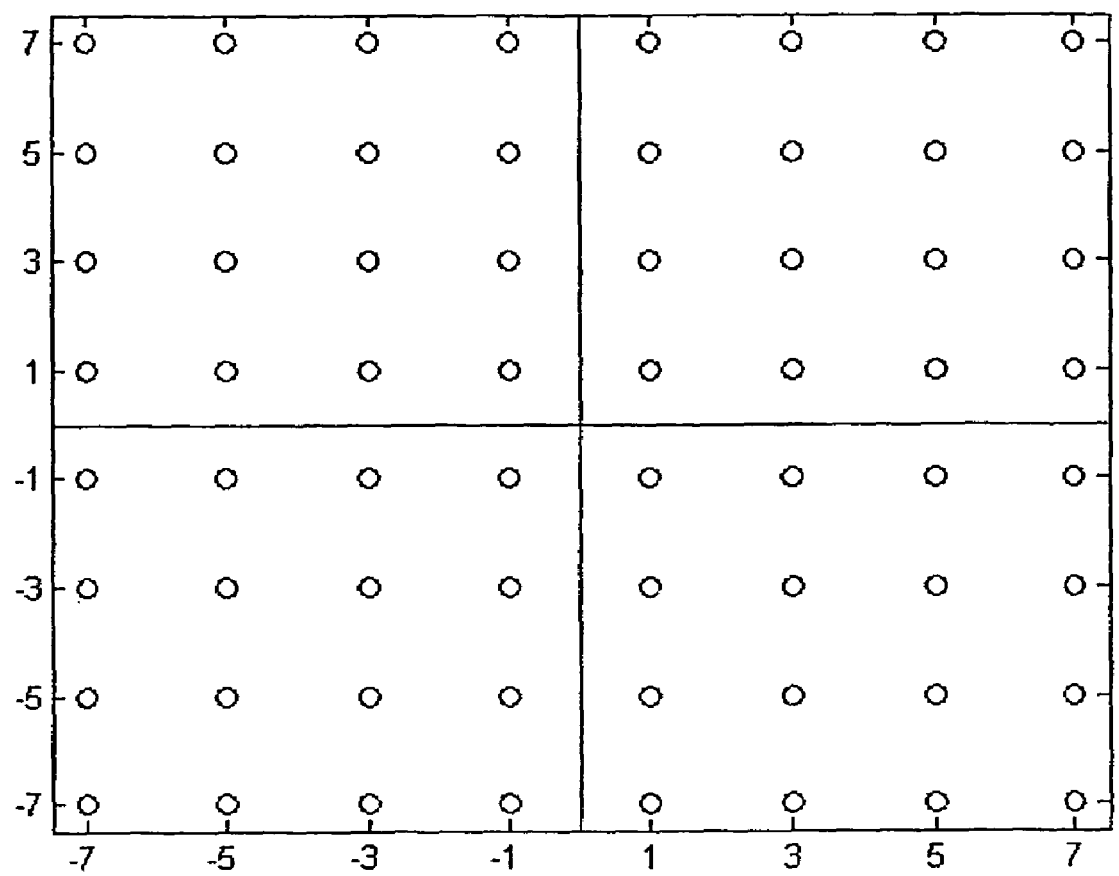
FIG. 6 shows a 64QAM constellation, and FIGS. 7A, 7B (Table 3) illustrate 64QAM symbols represented with binary inputs to weighting coefficient 1, 2 and 5 QPSK spreaders, in accordance with an embodiment of the invention.

FIG. 6 shows the 64QAM constellation. The 64 circles shown in FIG. 6 represent the positions of the 64QAM symbols.

FIGS. 7A, 7B (Table 3) illustrate 64QAM symbols represented with binary inputs to weighting coefficient 1, 2 and 5 QPSK spreaders (mapping (0,1,dtx)→(1,−1,0), dtx symbol corresponds to zero). Table 3 is distributed to FIGS. 6A, 6B in such a manner that the top of FIG. 7B has to be joined to the bottom of FIG. 7A for completely showing the Table 3.

The first column of Table 3 contains the 64QAM symbols, the three other columns contain the corresponding input to spreaders/modulators to obtain the 64QAM symbol. 64QAM symbol is obtained by summing the outputs of the three spreaders/modulators. First spreader has weighting coefficient 1, second spreader has weighting coefficient 2 and third spreader has weighting coefficient 5.

The above described embodiments present methods and systems for DTX. Especially, but not exclusively, in an implementation in hardware (see e.g. FIG. 1), there is preferably provided a DTX-control individually for I- and Q-components of QPSK-symbol.

Alternatively, the modulations mentioned can be created without DTX-functionality using QPSK-symbols:
16-QAM using weighting coefficients 2 and 1
64-QAM using weighting coefficients 4, 2 and 1

8-PSK can be composed by using complex weighting coefficients $$\frac{1 \pm j \times \tan(\pi/8)}{2}$$

This formula applies when QPSK symbols are used without dtx functionality.

8-PSK can also be composed by using complex weighting coefficients 1 and (1+j)/sqrt(2) and_and by activating DTX in one of the two QPSK modulators. The DTX by symbol is applied for selecting proper QPSK constellation subset out of 8-PSK constellation. 8-PSK is formed of two interlocked QPSK-constellations, which have a phase difference of 45 degree.

With two QPSK-modulators, which have the above mentioned phase difference executed by complex weighting coefficient, and with DTX functionality the preferred 8 PSK point can be chosen.

Further benefits of the invention are that the same hardware functionality (see e.g. FIG. 1) can carry out weighting for multi-level modulation and as well for power control.

Yet another benefit is that hardware functionality (see e.g. FIG. 1) carries out STTD-encoding for QPSK symbols (STTD, Space Time Transmit Diversity). This way the hardware-encoding works with other modulations as well without any updating.

Although the invention has been described above with reference to specific embodiments, the scope of the invention also covers any alterations, additions, modifications, and omissions of the disclosed features.

The invention claimed is:

1. Method for generating higher order modulations with QPSK modulators wherein
   a complex-valued input chip sequence is split into real and imaginary parts by a splitter and input to QPSK modulators in which the sequence is mapped to constellation points, multiplied with weighting coefficients in first multipliers, outputs of the multipliers are pulse shaped and supplied to second multipliers for multiplication by cos (ωt) and −sin(ωt), respectively, and the outputs of these multipliers are summed by an adder, thereby generating a resulting signal of the QPSK modulators,
   the resulting signal is spread by multiplying it with spreading code,
   constellation points of higher order modulation are mapped to inputs of the QPSK modulator, and,
   after modulation and spreading, QPSK symbols are summed to compose symbols of higher order modulation.

2. Method according to claim 1 wherein different mapping tables are generated for different modulation schemes.

3. Method according to claim 1, wherein symbols of higher order modulations are generated by summing up a number of weighted QPSK symbols.

4. Method according to claim 1, wherein constellation points of higher order modulation are mapped to inputs 0, 1 or DTX(=Discontinuous Transmission mode) of weighted QPSK modulators.

5. Method according to claim 1, wherein 8PSK symbol is obtained by summing the outputs of two spreaders/modulators having different weighting coefficients.

6. Method according to claim 1, wherein 16QAM symbol is obtained by summing the outputs of two spreaders/modulators.

7. Method according to claim 1, wherein 64QAM symbol is obtained by summing the outputs of three spreaders/modulators.

8. Method according to claim 1, wherein High Speed Downlink Packet Access (HSDPA) is used.

9. Method according to claim 1, wherein spreading and modulation are performed in the same operation in the transmitter.

10. System for generating higher order modulations with QPSK modulators comprising
   means for splitting a complex-valued chip sequence into real and imaginary parts,
   means for inputting the sequence to QPSK modulators in which the sequences is mapped to constellation points, multiplied with weighting coefficients in first means for multiplying, outputs of the first means for multiplying are pulse shaped and supplied to second means for multiplying for multiplication by $\cos(\omega t)$ and $-\sin(\omega t)$, respectively, and the outputs of the second means for multiplying are summed by means for adding, thereby generating a resulting signal of the QPSK modulators,
   means for spreading the resulting signal,
   means for mapping constellation points of higher order modulation to inputs of the QPSK modulator, and,
   means for summing, after modulation and spreading, QPSK symbols to compose symbols of higher order modulation.

11. System according to claim 10 comprising different mapping tables for different modulation schemes.

12. System according to claim 10, wherein the summing means is adapted to sum up a number of weighted QPSK symbols.

13. System according to claim 10, wherein the mapping means is adapted to map constellation points of higher order modulation to inputs 0, 1 or DTX(=Discontinuous Transmission mode) of weighted QPSK modulators.

14. System according to claim 10, wherein the summing means is adapted to sum the outputs of two spreaders/modulators for generating 8PSK or 16QAM symbols.

15. System according to claim 10, wherein the summing means is adapted to sum the outputs of three spreaders/modulators for generating 64QAM symbols.

* * * * *